(12) United States Patent
Han et al.

(10) Patent No.: US 7,935,325 B2
(45) Date of Patent: May 3, 2011

(54) RARE EARTH-ACTIVATED ALUMINUM NITRIDE POWDERS AND METHOD OF MAKING

(75) Inventors: Bing Han, Lansdale, PA (US); Jonathan H. Tao, Oceanside, CA (US); Madis Raukas, Charlestown, MA (US); Keith A. Klinedinst, Hudson, MA (US); Jan B. Talbot, San Diego, CA (US); Kailash A. Mishra, North Chelmsford, MA (US)

(73) Assignees: OSRAM SYLVANIA Inc., Danvers, MA (US); The Regents of the University of California, La Jolla, CA (US)

( * ) Notice: Subject to any disclaimer, the term of this patent is extended or adjusted under 35 U.S.C. 154(b) by 212 days.

(21) Appl. No.: 12/161,017

(22) PCT Filed: Dec. 20, 2006

(86) PCT No.: PCT/US2006/062368
§ 371 (c)(1),
(2), (4) Date: Oct. 21, 2008

(87) PCT Pub. No.: WO2007/089371
PCT Pub. Date: Aug. 9, 2007

(65) Prior Publication Data
US 2009/0252667 A1 Oct. 8, 2009

Related U.S. Application Data

(60) Provisional application No. 60/763,689, filed on Jan. 31, 2006.

(51) Int. Cl.
C01F 17/00 (2006.01)
C01B 21/072 (2006.01)
C23C 8/24 (2006.01)
C30B 11/00 (2006.01)
C30B 9/00 (2006.01)
C30B 19/00 (2006.01)
H01B 1/02 (2006.01)

(52) U.S. Cl. ....... 423/263; 423/412; 148/16.6; 148/317; 117/11; 117/73; 117/54; 252/518.1

(58) Field of Classification Search .................. None
See application file for complete search history.

(56) References Cited

U.S. PATENT DOCUMENTS
4,806,330 A * 2/1989 Melling et al. ............... 423/412
(Continued)

FOREIGN PATENT DOCUMENTS
EP           0 176 737        4/1986
WO      WO 2005/104767     11/2005

OTHER PUBLICATIONS

Garcia et al.; A Novel Method for the Synthesis of Sub-Microcrystalline Wurtzite-Type InxGa1-xN Powders; Materials Science and Engineering; B90, 7-12; 2002.*

(Continued)

Primary Examiner — Melvin C Mayes
Assistant Examiner — Guinever S Gregorio
(74) Attorney, Agent, or Firm — Robert F. Clark (57) ABSTRACT

Rare earth-activated aluminum nitride powders are made using a solution-based approach to form a mixed hydroxide of aluminum and a rare earth metal, the mixed hydroxide is then converted into an ammonium metal fluoride, preferably a rare earth-substituted ammonium aluminum hexafluoride $((NH_4)_3 Al_{1-x}RE_xF_6)$, and finally the rare earth-activated aluminum nitride is formed by ammonolysis of the ammonium metal fluoride at a high temperature. The use of a fluoride precursor in this process avoids sources of oxygen during the final ammonolysis step which is a major source of defects in the powder synthesis of nitrides. Also, because the aluminum nitride is formed from a mixed hydroxide co-precipitate, the distribution of the dopants in the powder is substantially homogeneous in each particle.

16 Claims, 11 Drawing Sheets

U.S. PATENT DOCUMENTS

| | | | |
|---|---|---|---|
| 4,810,679 | A | 3/1989 | Dole et al. |
| 6,051,303 | A | 4/2000 | Katsuda et al. |
| 6,916,676 | B2 * | 7/2005 | Sano et al. ............. 438/46 |
| 2003/0141506 | A1 | 7/2003 | Sano et al. |
| 2005/0093146 | A1 | 5/2005 | Sakano |
| 2007/0297969 | A1 * | 12/2007 | Van Patten et al. ........ 423/409 |

OTHER PUBLICATIONS

Lan et al.; Syntheses and Structure of Nanocrystalline Gallium Nitride Obtained From Ammonothermal Method Using Lithium Metal as Mineralizator; Materials Research Bulletin; 35, 2325.*

Garcia et al., A novel method for the synthesis of sub-microcrystalline wurzite-type $In_xGa_{1-x}N$ powders, Materials Science and Engineering B90 (2002) 7-12.

El-Himri et al., Preparation and optical spectroscopy of $Eu^{3+}$-doped GaN luminescent semiconductor from freeze-dried precursors, Journal of Solid State Chemistry 177 (2004) 4213-4220.

Faulhaber et al., Synthesis of nanocrystalline aluminum gallium nitride ($Al_xGa_{1-x}N$; x=0.1 to 0.5) with oxide precursors via ammonolysis, J. Mater. Res., vol. 18, No. 10, (2003) 2350-2358.

* cited by examiner

RARE EARTH-ACTIVATED ALUMINUM NITRIDE POWDERS AND METHOD OF MAKING

CROSS REFERENCES TO RELATED APPLICATIONS

This application claims the benefit of U.S. Provisional Application No. 60/763,689, filed Jan. 31, 2006. This application is a continuation-in-part of copending U.S. application Ser. No. 11/161,403, filed Aug. 2, 2005, which is a nonprovisional of U.S. Application Ser. No. 60/601,382, filed Aug. 13, 2004, the disclosures of which are incorporated herein by reference.

STATEMENT REGARDING FEDERALLY SPONSORED RESEARCH

This invention was made with Government support under DE-FC26-04NT42274 awarded by DOE.

TECHNICAL FIELD

The present invention is directed to light emitting diodes (LEDs), and more particularly to light emitting diodes that produce a white light emission.

BACKGROUND OF THE INVENTION

Solid state lighting uses several approaches to produce white light. The color mixing approach combines the red, green and blue emissions from three monochromatic LEDs to produce white light. Since each monochromatic LED light source can have high internal quantum efficiency, such a device could generate white light at a relatively high lumens per watt. However, the space needed for three LEDs can be burdensome and the packaging to place them together is cumbersome. The wavelength conversion approach uses ultraviolet (UV) emitting LEDs to generate UV light (generally from about 380 nm to about 420 nm) which is then converted to white light using a triblend phosphor system that is excited by the UV light. This is similar to the way white light is produced in known Hg-discharge fluorescent lamps. However, most conventional photoluminescent phosphors are optimized for excitation by the 254 nm radiation emitted by mercury discharges and not the longer wavelength UV radiation of LEDs. Additional work remains to develop a full range of phosphors for use with UV-emitting LEDs. The third approach is a hybrid in which a blue emission is provided by a GaInN LED and part of the blue emission is converted to a complementary emission by a phosphor. White light sources based on this design have been developed using a broad band emitter, in particular, cerium-activated yttrium aluminum garnet, $Y_3Al_5O_{12}:Ce^{3+}$ ($YAG:Ce^{3+}$). This design avoids the large Stokes shift associated with a higher energy UV photon at 380 nm being converted to a visible photon. A similar design has been proposed which uses a second semiconducting layer, known as passive layer, that partly converts the emission from InGaN at 450 nm to a red photon near 620 nm with a InGaP alloy. This is essentially a double heterojunction structure with InGaN as the active layer and InGaP as the passive layer; InGaP acts as a phosphor.

Phosphors in lighting devices present various engineering problems, such as lack of stability, degradation in the epoxy dome, coating uniformity, and scattering of visible light, all of which can be avoided if the lighting device does not include phosphors. As used, herein the term phosphor refers to photoluminescent materials, i.e., materials that convert photons of one energy to photons of a different energy.

SUMMARY OF THE INVENTION

In a preferred embodiment, U.S. Patent Application Publication No. 2005/0253162 describes the generation of white light with a nitride-based light emitting diode (LED) wherein one or more nitride-based layers have been doped with suitable luminescent ions. Such a solid state light source will not need any external coating of phosphor to convert the light generated through the recombination of electrons and holes introduced into this region under forward biasing conditions. Additionally, the photon extraction efficiency will be higher compared to the conversion of the band edge emission to white light using a phosphor since the photon emitted through recombination of electron-hole (e-h) pairs at the activator ions will be significantly Stokes-shifted. These photons will have energies far less than the band gap of the host material where the absorption coefficient of the material is low. Photons generated within a nitride have a long confinement time within the material due to total internal reflections because of the high dielectric constant of the material. When the emission occurs close to the band edge, as is the case for excitonic or host emission, only a small fraction of emitted photons can escape the nitride host due to re-absorption. It is believed that this is the reason for the low extraction coefficient for photons emitted by nitride layers with excitonic or host emission. Emission from rare earth ions, however, would occur at energies significantly less than the band gap. Thus, in spite of the long residence time due to total internal reflection, these photons would have a better chance of escaping the device which would enhance the overall efficiency of solid state light sources.

In order to design such a phosphorless solid state light source, one needs to optimize the compositions for high efficacy and color rendering index for white light generation. It is expected that this may be accomplished by adjusting the band edge emission to coincide to the excitation peaks of fluorescent ions. Once the excitation peaks of activator ions are determined in a nitride matrix, the band edge emission could be adjusted by varying the composition of the nitride alloy. Since the fluorescence from the activator ions depends on energy transfer from the host, the activator ion concentration could also be adjusted to enhance the overall fluorescence efficiency.

Aluminum nitride, because of its large energy gap (6.2 eV), is an excellent host for screening rare earth ion dopants based on their excitation properties. However, making high purity aluminum nitride with aluminum oxide as a precursor is almost impossible even though oxide precursors have been used in the past for synthesizing nitrides of Ga and In. Instead, we have discovered a solution-based approach that forms a mixed hydroxide of aluminum and a rare earth metal, then converts the mixed hydroxide into an ammonium metal fluoride, preferably a rare earth-substituted ammonium aluminum hexafluoride ($(NH_4)_3Al_{1-x}RE_xF_6$), and then finally into the nitride by ammonolysis of the ammonium metal fluoride at high temperature. The use of a fluoride precursor in this process avoids sources of oxygen during the final ammonolysis step which is a major source of defects in the powder synthesis of nitrides. Also, because the aluminum nitride is formed from a mixed hydroxide co-precipitate, the distribution of the dopants in the powder is substantially homogeneous in each particle as compared to ion implantation for doping AlN thin films wherein the concentration of the dopants is expected to be greater at the surface.

In accordance with one aspect of the invention, there is provided a method that comprises:
(a) forming an aqueous mixture containing aluminum and a rare earth metal;
(b) precipitating a mixed hydroxide of aluminum and the rare earth metal;
(c) reacting the mixed hydroxide with ammonium fluoride to form a fluoride compound of aluminum and the rare earth metal;
(d) drying the fluoride compound; and
(e) reacting the dried fluoride compound with ammonia gas to form the rare earth-activated aluminum nitride.

The rare earth metal used in the method is preferably selected from Dy, Tb, Eu, Tm, Ho, Sm, Er, Nd, Pr, Gd, and combinations thereof and more preferably selected from Tb, Eu, Tm, Dy, and combinations thereof. In a preferred embodiment, the aqueous mixture is formed by dissolving aluminum nitrate and a nitrate of the rare earth metal.

In accordance with another aspect of the invention, there is provided a rare earth-activated aluminum nitride powder that comprises particles of aluminum nitride having a rare earth dopant that is distributed substantially homogeneously in each particle. Preferably, the rare earth dopant is selected from Dy, Tb, Eu, Tm, Ho, Sm, Er, Nd, Pr, Gd, and combinations thereof. More preferably, the rare earth dopant is selected from Tb, Eu, Tm, Dy, and combinations thereof. These materials exhibit photoluminescent properties and may be used in the manufacture of nitride-based LEDs, preferably for the generation of white light.

DETAILED DESCRIPTION OF THE INVENTION

For a better understanding of the present invention, together with other and further objects, advantages and capabilities thereof, reference is made to the following disclosure and appended claims taken in conjunction with the above-described drawings.

The identification of candidate rare earth ions for doping a large gap nitride, such as AlN, with rare earth ions may be accomplished by probing their excited state characteristics using fluorescence spectroscopy. In particular, the wide band gap of aluminum nitride (6.2 eV) allows one to determine the excitation peaks uniquely in nitride hosts. Since the rare earth ions entering substitutionally into the nitride hosts are tetrahedrally coordinated to nitrogen atoms, these absorption or excitation peaks will not vary significantly for Al, Ga and In nitrides or their alloys.

Powdered materials are preferred in contrast to thin films or single crystals because the residence time of a single photon within a powder sample is longer than that of a single crystal or thin films due to scattering. Thus, weak absorption or emission processes are enhanced significantly to allow a thorough investigation of underlying luminescence processes such as band edge emission, defect emission, excitation and emission for the parity forbidden f-to-f intraband transitions.

A new approach for synthesizing and optimizing nitride semiconductors activated by suitably chosen rare earth ions has been developed. These activators are selected based on their abilities to convert the electron and hole pairs in the host lattice to visible light. The activator ions may consist of multiple types of ions such that superposition of emission spectra from the individual activator ions will lead to white light emission with high efficacy and color rendering index.

A preferred synthesis method proceeds according to the following steps. In the first step (Equation 1), nitrates of aluminum as well as the rare earth ions are dissolved in deionized water. The required amount of ammonium hydroxide is then added to form a semi-solid gel of a combined aluminum-rare earth hydroxide that is separated by filtration. The hydroxide is then rinsed with deionized water until no change in the pH of the filtrate is observed.

(1)

In the second step, the cleaned hydroxide is reacted with a concentrated ammonium fluoride solution at about 80° C. according to the following reaction:

(2)

The fluoride product of step two is then introduced into a furnace and dried at 200° C. for 12 hours. Once the fluoride product, $(NH_4)_3Al_{1-x}RE_xF_6$, is dry, it is heated in an ultrahigh purity ammonia atmosphere at high temperature (preferably about 900° C. for about 2.5 hours) to completely convert the fluorides to nitrides. This step can be represented as:

(3)

The alloy composition of the final product, $Al_xRE_{1-x}N$, as well as the rare earth dopant concentration, are controlled by the amounts of the different nitrates used in the first step.

It has been found that the products at the end of second step may contain tetrafluorides, $(NH_4)Al_xRE_{1-x}F_4$, in addition to hexafluorides, $(NH_4)_3Al_xRE_{1-x}F_6$. Although the ammonium aluminum hexafluorides are normally water soluble in contrast to those of Ga and In, a white residue is always left behind at the end of step 2. Elemental analysis of this residue shows traces of oxygen which have been found to be difficult to remove during the ammonolysis step. In order to make high purity AlN, it is necessary remove the source of oxygen at the end of Step 2. This was achieved by increasing the amount of aqueous ammonium fluoride in excess of the stoichiometric amount and accelerating the reaction kinetics by increasing the temperature of reaction. Both actions help move the reaction forward to completion in Equation 2. Subsequent elemental analysis of the AlN at the end of Step 3 found a lower oxygen content and the absence of any second phase in the final product.

Nitride semiconductors activated by different rare earth ions are synthesized by the approach described above. In the following examples, a yellow emission from AlN:Dy, a blue emission from AlN:Tm, and green and red emissions from AlN:Tb, AlN:Eu and AlN:Tb,Eu are demonstrated. These results indicate that by choosing suitable ions with controlled concentrations, a white light emission having a high efficacy and color rendering index may be produced. It is also shown that $Tb^{3+}$ can act as a sensitizer for $Eu^{3+}$ ions. This is particularly important for designing a white light emitting material since the alloy composition needs to be optimized with respect to a suitably chosen sensitizer ion which will be excited through e-h pair injection to the active layer while other rare earth ions will be sensitized by this activator ion. From this perspective, sensitization of $Eu^{3+}$ ion by $Tb^{3+}$ is a very important discovery from the perspective of active layer design and has been observed for the first time in a nitride host.

AlN:Dy

AlN:Dy (Dy 1 atomic percent) powder samples were synthesized by the following procedure. In the first step (Equation 4), nitrates of aluminum and dysprosium are dissolved in deionized water. The required amount of ammonium hydroxide is then added to form a semi-solid gel of aluminum-dysprosium-hydroxide that is separated by filtration. The hydroxide is then rinsed with deionized water until no change in the pH of the filtrate is observed.

$$0.99Al(NO_3)_3(aq)+(0.01)Dy(NO_3)_3(aq)+3NH_4OH \Rightarrow Al_{0.99}Dy_{0.01}(OH)_3(s)+3NH_4NO_3 \quad (4)$$

In the second step the cleaned hydroxide is reacted with a concentrated ammonium fluoride solution according to the following reaction:

$$Al_{0.99}Dy_{0.01}(OH)_3(s)+6NH_4F(aq) \Rightarrow (NH_4)_3 Al_{0.99}Dy_{0.01}F_6(s)+3H_2O(l)+3NH_3(g) \quad (5)$$

The fluoride product is then introduced into a furnace and dried at 200° C. for 12 hours. Once the product $(NH_4)_3 Al_{0.99}Dy_{0.01}F_6$ is dry, it is heated in an ultrahigh purity ammonia atmosphere at high temperature (900° C. for 2.5 hours) to convert the fluorides to nitrides. This step can be represented as:

$$(NH_4)_3Al_{0.99}Dy_{0.01}F_6(s)+4NH_3(g) \Rightarrow Al_{0.99}Dy_{0.01} N(s)+6NH_4F(g) \quad (3)$$

Figure 1:
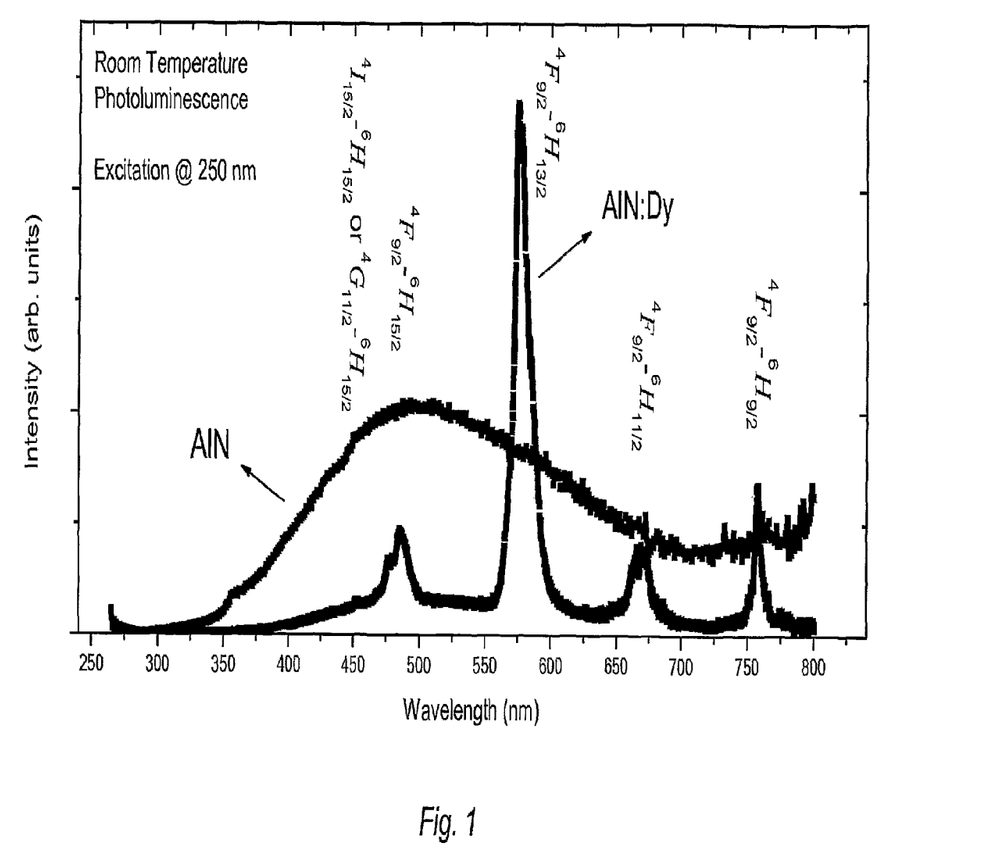
FIG. 1 is a room temperature photoluminescence (PL) spectrum of AlN:Dy compared to undoped AlN.

FIG. 1 shows the room temperature photoluminescence (PL) spectrum of an AlN:Dy sample compared to an undoped AlN sample synthesized by the same method. The excitation wavelength is 250 nm. As shown in FIG. 1, the f-f intra-configurational transitions associated with $Dy^{3+}$ ions are observed and identified. These results indicate that in the synthesized powder sample, the Dy dopant is optically active in the trivalent state. The PL spectrum for undoped AlN is dominated by broad defect-related emissions peaked around 500 nm. In the Dy-doped AlN sample, this defect emission is effectively quenched.

The PL spectrum shown in FIG. 1 indicates AlN:Dy synthesized by this method is a yellow phosphor, which has the strongest radiative emission ($^4F_{9/2}$-$^6H_{13/2}$) at 575 nm. To determine the excitation processes leading to the $Dy^{3+}$ $^4F_{9/2}$-$^6H_{13/2}$ transition in AlN, the UV-Visible excitation spectrum is measured with the emission wavelength fixed at 575 nm while the excitation wavelength was scanned between 200 and 560 nm. The resulting photoluminescence excitation (PLE) spectrum is shown in FIG. 2.

Figure 2:
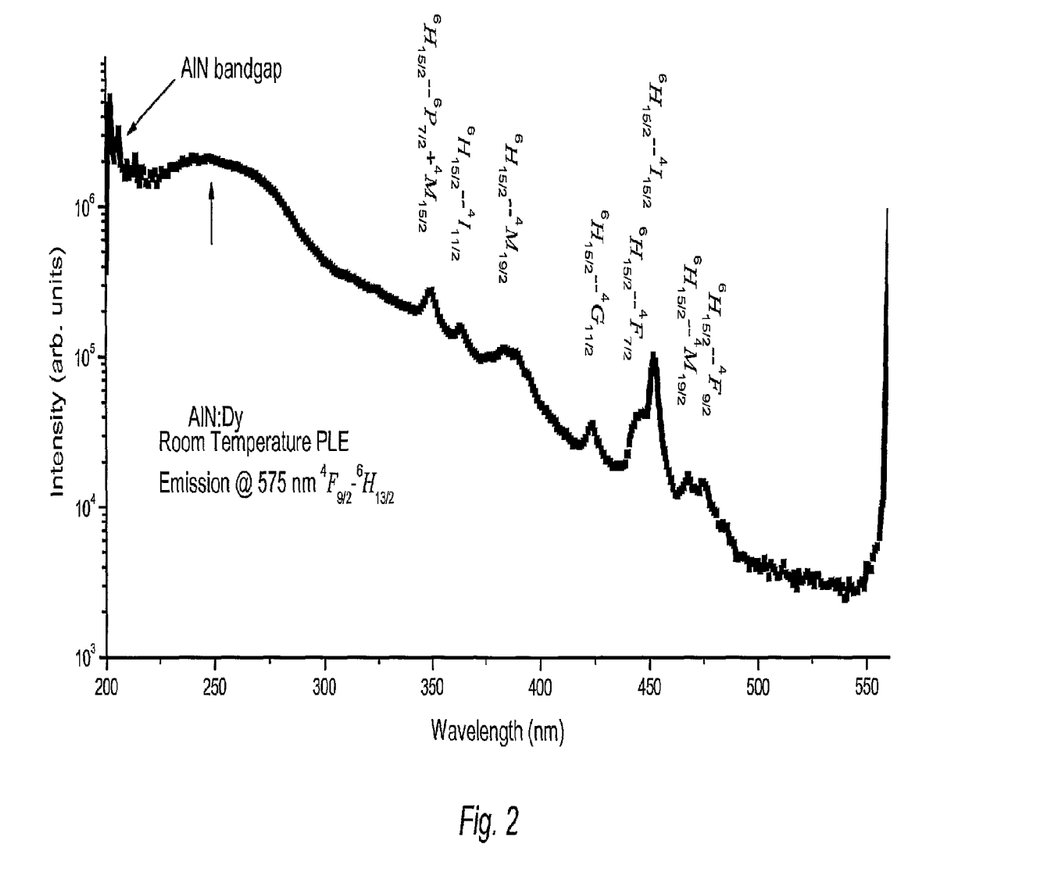
FIG. 2 is a room temperature photoluminescence excitation (PLE) spectrum of the $Dy^{3+}$ $^4F_{9/2}$-$^6H_{13/2}$ transition in AlN wherein the emission wavelength is fixed at 575 nm.

The PLE spectrum in FIG. 2 clearly demonstrates three different excitation mechanisms: (1) photons with above band gap energy, hv <230 nm, are absorbed by the AlN host creating electrons and holes in the conduction and valence bands, respectively, and the intra 4f shell transition is subsequently exited by non-radiative energy transfer to the $Dy^{3+}$ ions; (2) the broad band between 230 and 300 nm, with the maximum at 250 nm, is tentatively attributed to a defect-related transition involving oxygen; and (3) the weak, sharp peaks between 300 and 500 nm are attributed to the intra-configurational transitions of $Dy^{3+}$ ions. The assignments for the $Dy^{3+}$ transitions are made by comparisons with data from the literature for $YAl_3(BO_3)_4$:Dy (G. Dominiak-Dzik, Radiation Measurements 38, 557 (2004)).

The characteristic $Dy^{3+}$ transition wavelengths and assignments in AlN are summarized in Table 1.

TABLE 1

| $(RE)^{3+}$ ion | λ (nm) at room temperature | Transitions Assignments |
|---|---|---|
| Dy | 349.0 | $^6H_{15/2}$-$^6P_{7/2}$ + $^4M_{15/2}$ |
|  | 366.8 | $^6H_{15/2}$-$^4I_{11/2}$ |
|  | 385.2 | $^6H_{15/2}$-$^4M_{19/2}$ |
|  | 423.9 | $^6H_{15/2}$-$^4G_{11/2}$ |
|  | 445.4 | $^6H_{15/2}$-$^4F_{7/2}$ |
|  | 452.4 | $^6H_{15/2}$-$^4I_{15/2}$ |
|  | 467.9 | $^6H_{15/2}$-$^4M_{19/2}$ |
|  | 474.8 | $^6H_{15/2}$-$^4F_{9/2}$ |
|  | 575.6 | $^6H_{13/2}$-$^4F_{9/2}$ |
|  | 669.4 | $^6H_{11/2}$-$^4F_{9/2}$ |
|  | 757.7 | $^6H_{9/2}$-$^4F_{9/2}$ |

AlN:Tm

Figure 3:
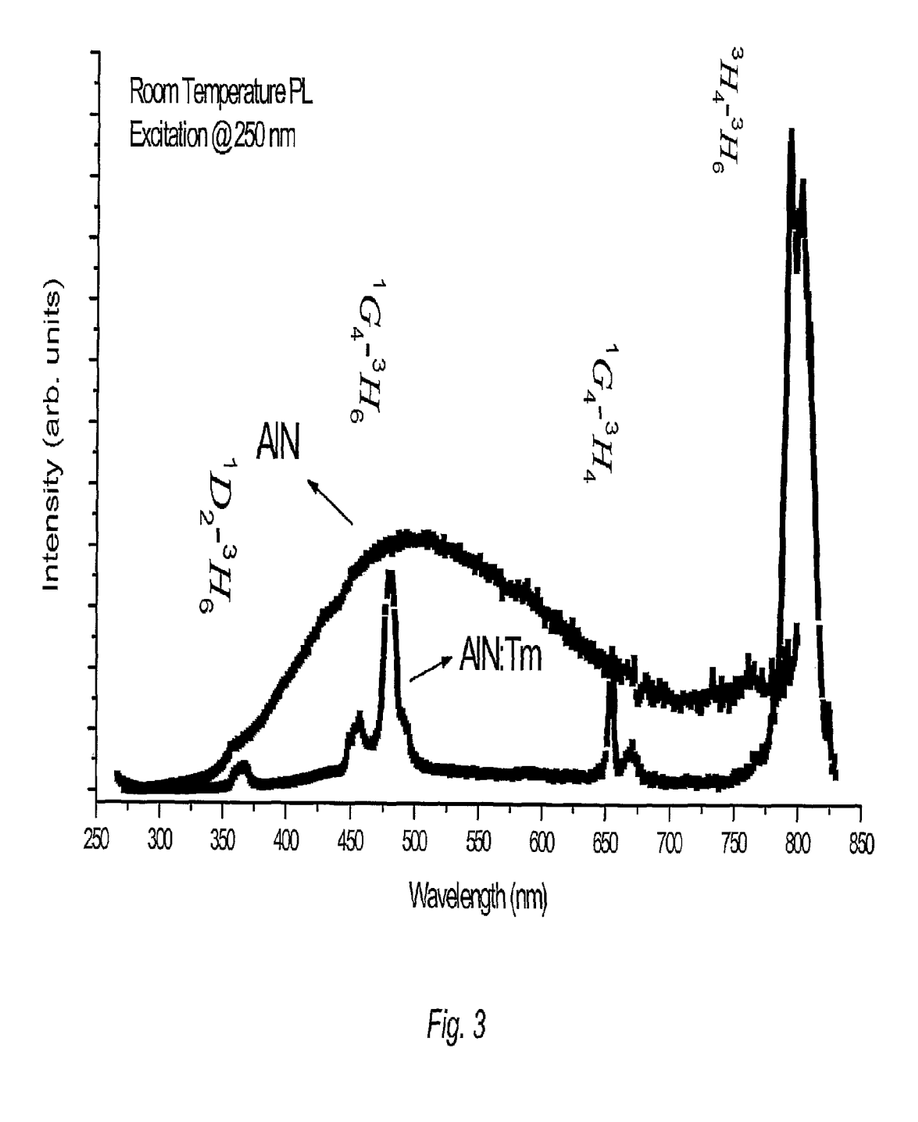
FIG. 3 is a room temperature PL spectrum of AlN:Tm compared to undoped AlN.

The AlN:Tm powder samples were synthesized similarly to the AlN:Dy sample as discussed above. Thulium nitrate, $Tm(NO_3)_3$ was used instead of $Dy(NO_3)_3$. FIG. 3 shows the room temperature PL spectrum of an AlN:Tm sample compared with undoped AlN made by the same method. The excitation wavelength is 250 nm. As shown in FIG. 3, the $Tm^{3+}$ optical transitions are clearly observed. The assignments for the $Tm^{3+}$ transitions are made by comparisons with data from the literature for thin film AlN:Tm (J. B. Gruber, U. Vetter, H. Hofsäss, B Zandi, and M. F. Reid, Phys. Rev. B. 70, 245108 (2004)) and $YVO_4$:Tm (H. Zhang, Solid State Commun. 132, 527 (2004)) powder samples. These results indicate that in the synthesized powder sample, the Tm dopant is optically active in the trivalent state. It should be noted that in the Tm doped AlN sample, the defect emission is effectively quenched when comparing to undoped AlN.

The PL spectrum is dominated by the intra-configurational f-f shell transitions of $Tm^{3+}$. The strongest emission with a peak wavelength of 792 nm is attributed to the $^3H_4$-$^3H_6$ transition of $Tm^{3+}$. The blue emission near 481 nm due to the $^1G_4$-$^3H_6$ transition will be useful for application of this material as a blue emitter in solid state lighting applications.

To determine the excitation processes leading to the $Tm^{3+}$ $^3H_4$-$^3H_6$ transition in AlN, the UV-Visible excitation spectrum is measured with the emission wavelength fixed at 792 nm while the excitation wavelength was scanned between 200 and 700 nm. The photoluminescence excitation (PLE) spectrum is shown in FIG. 4.

Figure 4:
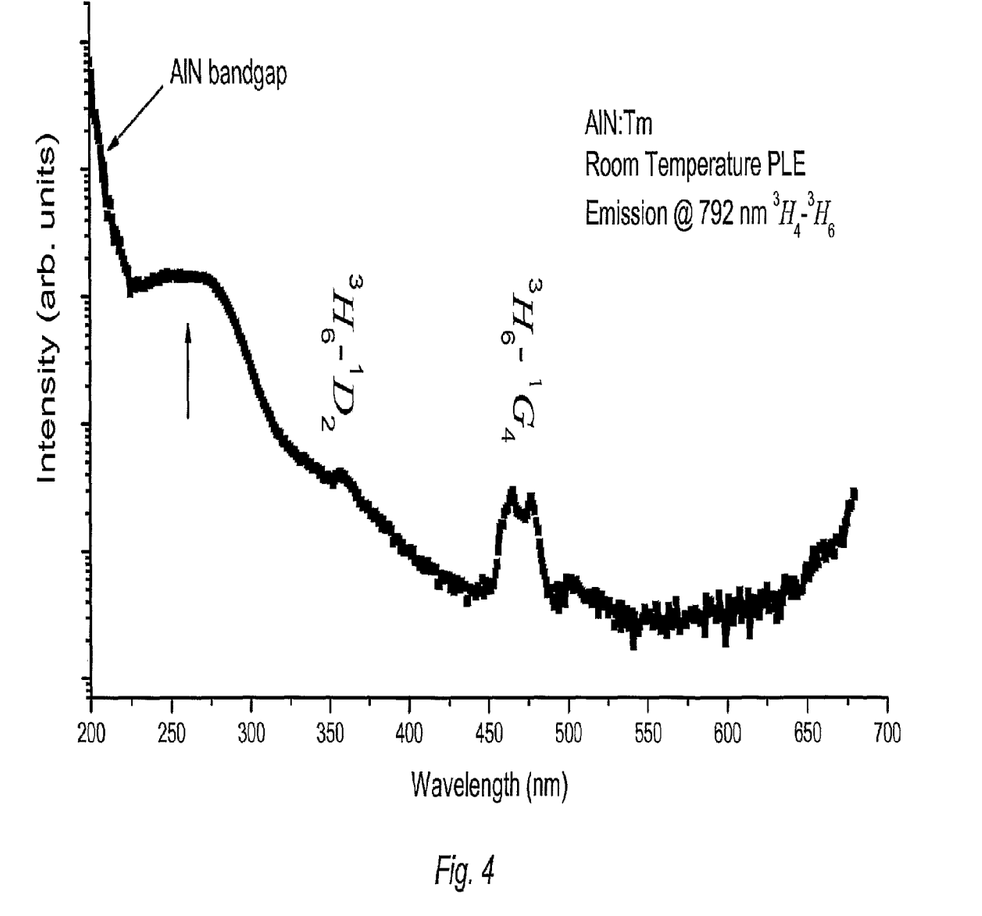
FIG. 4 is a room temperature PLE spectrum of the $Tm^{3+}$ $^4G_1$-$^3H_5$ transition in AlN wherein the emission wavelength is fixed at 792 nm.

The PLE spectrum in FIG. 4 clearly demonstrates three different excitation mechanisms: (1) photons with above band gap energy, hv <230 nm, are absorbed by the AlN host creating electrons and holes in the conduction and valence bands, respectively, and the intra 4f shell transition is subsequently exited by non-radiative energy transfer from the electron-hole pairs to the $Tm^{3+}$ ions; (2) the broad band between 230 and 325 nm, with the maximum at 250 nm, is tentatively attributed to a defect-related transition; and (3) the weak, sharp peaks between 300 and 500 nm are attributed to the intra-configurational transitions of $Tm^{3+}$ ions.

The characteristic $Tm^{3+}$ transition wavelengths and assignments in AlN are summarized in Table 2.

TABLE 2

| $(RE)^{3+}$ ion | λ (nm) at room temperature | Transitions Assignments |
|---|---|---|
| Tm | 356 | $^3H_6$-$^1D_2$ |
|  | 481 | $^3H_6$-$^1G_4$ |
|  | 655 | $^3H_4$-$^1G_4$ |
|  | 792 | $^3H_6$-$^3H_4$ |

AlN:Tb

AlN:Tb powder samples were synthesized similarly to the AlN:Dy sample as discussed above. Terbium nitrate, $Tb(NO_3)_3$, was used instead of $Dy(NO_3)_3$.

Figure 5:
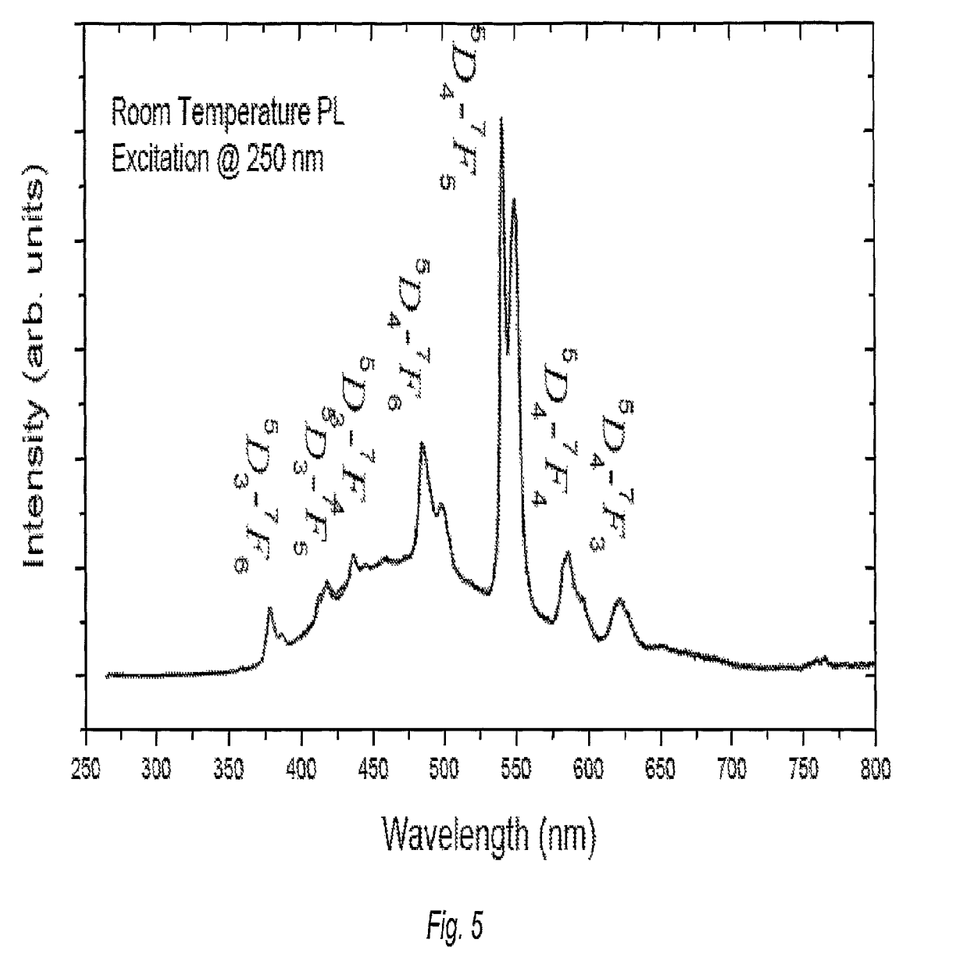
FIG. 5 is a room temperature PL spectrum of AlN:Tb in the wavelength range between 300 and 600 nm.

FIG. 5 shows the room temperature PL spectrum of AlN: Tb in the wavelength range between 270 and 800 nm. The excitation wavelength is 250 nm. As shown in FIG. 5, the $Tb^{3+}$ related optical transitions are clearly observed. The spectrum between 270 and 800 nm is dominated by the intra-configurational f-f shell transitions of $Tb^{3+}$. The assignments for the $Tb^{3+}$ transitions are made by comparisons with data from the literature for thin film AlN:Tb (W. M. Jadwisienczak, H. Z. Lozykowski, F. Perjeru, H. Chen, M. Kordesch, and I. G. Brown, *Appl. Phys. Lett.* 76, 3376 (2000)).

These results indicate that in the synthesized powder sample, the Tb dopant is optically active in the trivalent state. The emission near 542 nm due to the $^5D_4$-$^7F_5$ f-f transition will be useful for application of this material as a yellowish-green emitter in solid state lighting applications.

To determine the excitation processes leading to the $Tb^{3+}$ $^5D_4$-$^7F_5$ transition in AlN, the UV-Visible excitation spectrum is measured with the emission wavelength fixed at 542 nm while the excitation wavelength was scanned between 200 and 525 nm. The obtained PLE spectrum is shown in FIG. 6.

Figure 6:
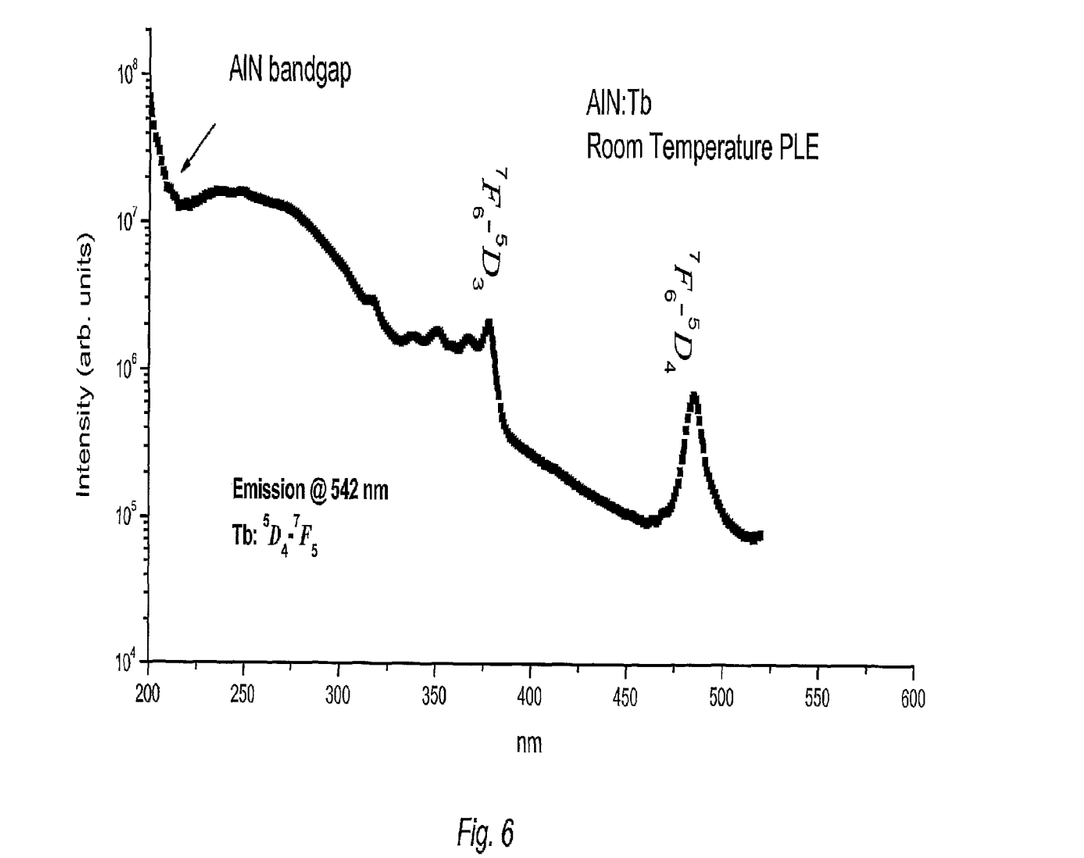
FIG. 6 is a room temperature PLE spectrum of the $Tb^{3+}$ $^5D_4$-$^7F_5$ transition in AlN wherein the emission wavelength is fixed at 542 nm.

The PLE spectrum in FIG. 6 clearly demonstrates three different excitation mechanisms: (1) photons with above band gap energy, hv <230 nm, are absorbed by the AlN host creating electrons and holes in the conduction and valence bands, respectively, and the intra 4f shell transition is subsequently exited by non-radiative energy transfer from the electron-hole pairs to the $Tb^{3+}$ ions; (2) the broad band between 230 and 500 nm, with the maximum at 300 nm, is not determined at this point; and (3) the weak, sharp peaks between 300 and 525 nm are attributed to the intra-configurational transitions of $Tb^{3+}$ ions.

The characteristic $Tb^{3+}$ transition wavelengths and assignments in AlN are summarized in Table 3.

TABLE 3

| $(RE)^{3+}$ ion | λ (nm) at room temperature | Transitions Assignments |
|---|---|---|
| Tb | 378 | $^7F_6$-$^5D_3$ |
|  | 416 | $^7F_5$-$^5D_3$ |
|  | 435 | $^7F_4$-$^5D_3$ |
|  | 484 | $^7F_6$-$^5D_4$ |
|  | 542 | $^7F_5$-$^5D_4$ |

TABLE 3-continued

| $(RE)^{3+}$ ion | λ (nm) at room temperature | Transitions Assignments |
|---|---|---|
|  | 585 | $^7F_4$-$^5D_4$ |
|  | 621 | $^7F_3$-$^5D_4$ |

Figure 7:
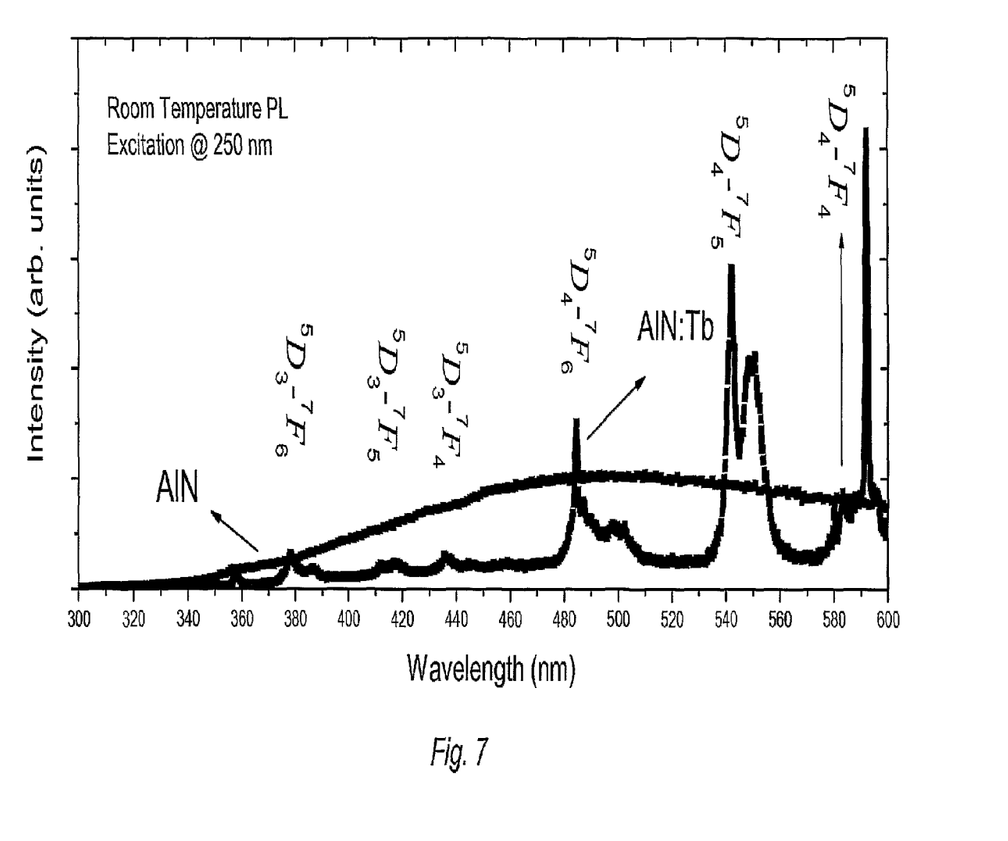
FIG. 7 is a room temperature PL spectrum of AlN:Tb,Eu compared to undoped AlN in the wavelength range between 300 and 600 nm.
Figure 8:
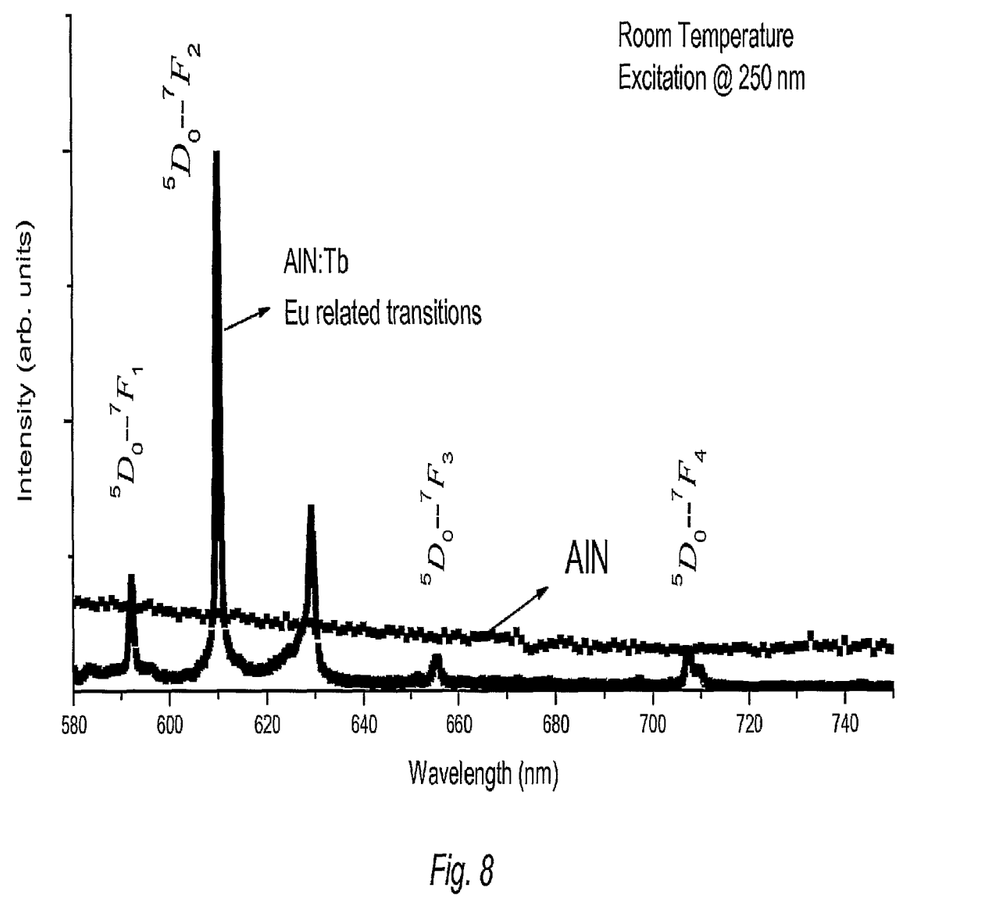
FIG. 8 is a room temperature PL spectrum of AlN:Tb,Eu compared to undoped AlN in the wavelength range between 580 and 750 nm.

AlN:Tb,Eu a) Tb Related Emissions:

FIG. 7 shows the room temperature PL spectrum of AlN: Tb,Eu in the wavelength range between 300 and 600 nm compared with undoped AlN made by the same method. The excitation wavelength is 250 nm. As shown in FIG. 7, the $Tb^{3+}$ related optical transitions are clearly observed. The spectrum between 300 and 600 nm is dominated by the intra-configurational f-f shell transitions of $Tb^{3+}$. It should be noted that in the Tb doped AlN sample, the defect emission is effectively quenched when comparing to undoped AlN.

b) Eu Related Emissions:

Also observed in AlN:Tb,Eu is a strong luminescence characteristic of the $Eu^{3+}$ ions. FIG. 8 shows the room temperature PL spectrum of an AlN:Tb,Eu sample in the wavelength range between 580 and 750 nm compared with undoped AlN made by the same method. The excitation wavelength is 250 nm. As shown in FIG. 8, the $Eu^{3+}$ related optical transitions are clearly observed. The assignments for these $Eu^{3+}$ transitions were made by comparisons with data from the literature for $LaF_3$:Eu single crystal (W. T. Carnall, G. L. Goodman, K. Rajnak, and R. S. Rana, J. Chem. Phys. 90, 3443 (1989)). The Eu ions are optically active in the trivalent state. It should be noted that the defect emission is effectively quenched when comparing to undoped AlN. The red emission near 610 nm due to $^5D_0$-$^7F_2$ f-f transition will be useful for application of this material as a red emitter in solid state lighting applications.

To determine the excitation processes leading to the $Eu^{3+}$ $^5D_0$-$7F_2$ transition in AlN, the UV-Visible excitation spectrum is measured with the emission wavelength fixed at 610 nm while the excitation wavelength was scanned between 200 and 525 nm. The obtained PLE spectrum is shown in FIG. 9.

Figure 9:
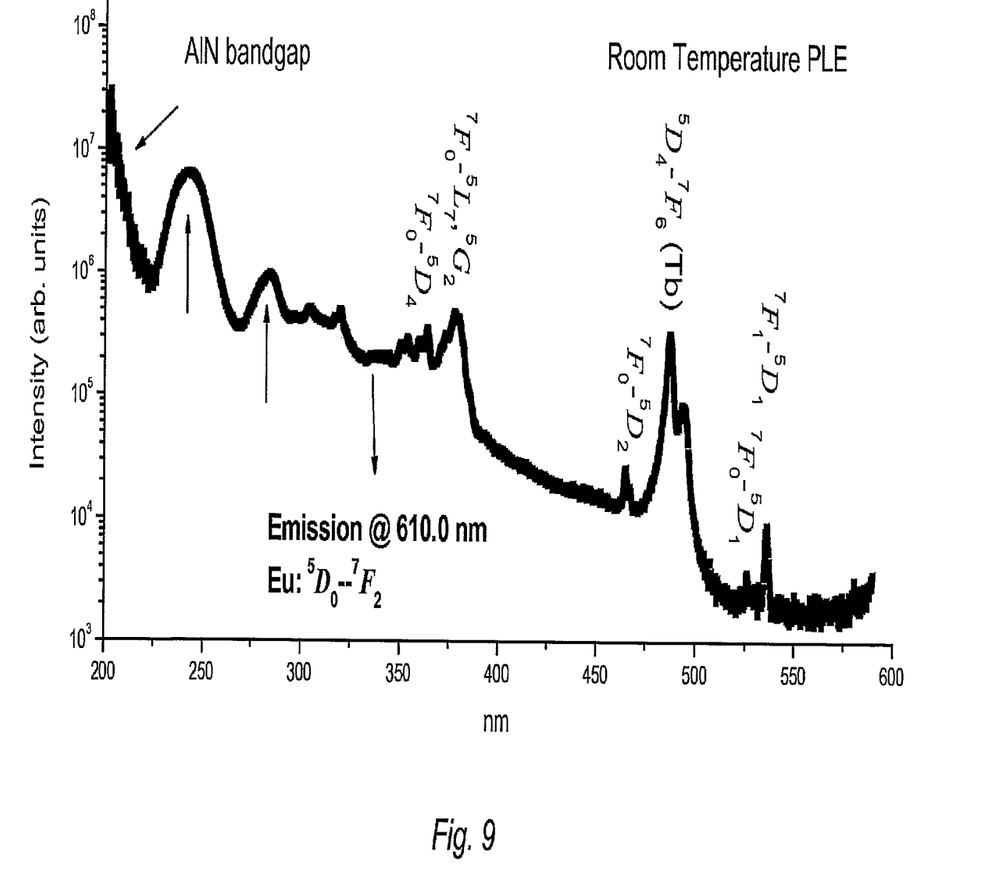
FIG. 9 is a room temperature PLE spectrum the $Eu^{3+}$ $^5D_0$-$^7F_2$ transition in AlN:Tb,Eu wherein the emission wavelength is fixed at 610 nm.

The PLE spectrum in FIG. 9 clearly demonstrates four different excitation mechanisms: (1) photons above the band gap are absorbed by the AlN host creating electrons and holes in the conduction and valence bands, respectively, and the intra 4f shell transition is subsequently exited by non-radiative energy transfer from the electron-hole pairs to the $Eu^{3+}$ ions; (2) the origins of the two broad bands with maxima at 240 and 280 nm, respectively, are not determined at this point; (3) the weak, sharp peaks between 300 and 575 nm are attributed to the intra-configurational transitions of $Eu^{3+}$ ions (the assignments for the $Eu^{3+}$ transitions are made by comparisons with data from the literature for Eu+ doped fluoride glasses (M. Dejneka, E. Snitzer, and R. E. Riman, J. Lumin. 65, 227 (1995))); and (4) the weak, sharp peak at 487 nm is attributed to the $Tb^{3+}$ $^7F_6$-$^5D_4$ transition. The energy transfer from $Tb^{3+}$ to $Eu^{3+}$ has been previously observed in $Eu^{3+}$ and $Tb^{3+}$ codoped $CaWO_4$ (M. V. Nazarov, D. Y. Jeon, J. H. Kang, E. G. Popovici, L. E. Muresan, M. V. Zamoryanskaya, B. S. Tsukerblat, *Solid State Communications* 131, 307 (2004)). The processes of $Eu^{3+}$ excitation are attributed to be $^5D_4$ $(Tb^{3+})$+$^7F_0(Eu^{3+})$→$^7F_5(Tb^{3+})$+$^5D_1$ $(Eu^{3+})$.

The characteristic $Eu^{3+}$ transition wavelengths and assignments in AlN are summarized in Table 4.

TABLE 4

| $(RE)^{3+}$ ion | λ (nm) at room temperature | Transitions Assignments |
|---|---|---|
| Eu | 364 | $^7F_0$-$^5D_4$ |
|  | 378 | $^7F_0$-$^5L_7$, $^5G_2$ |
|  | 465 | $^7F_0$-$^5D_2$ |
|  | 526 | $^7F_0$-$^5D_1$ |
|  | 536 | $^7F_1$-$^5D_1$ |
|  | 592 | $^5D_0$-$^7F_1$ |
|  | 610 | $^5D_0$-$^7F_2$ |
|  | 655 | $^5D_0$-$^7F_3$ |
|  | 707 | $^5D_0$-$^7F_4$ |

AlN:Eu

Figure 10:
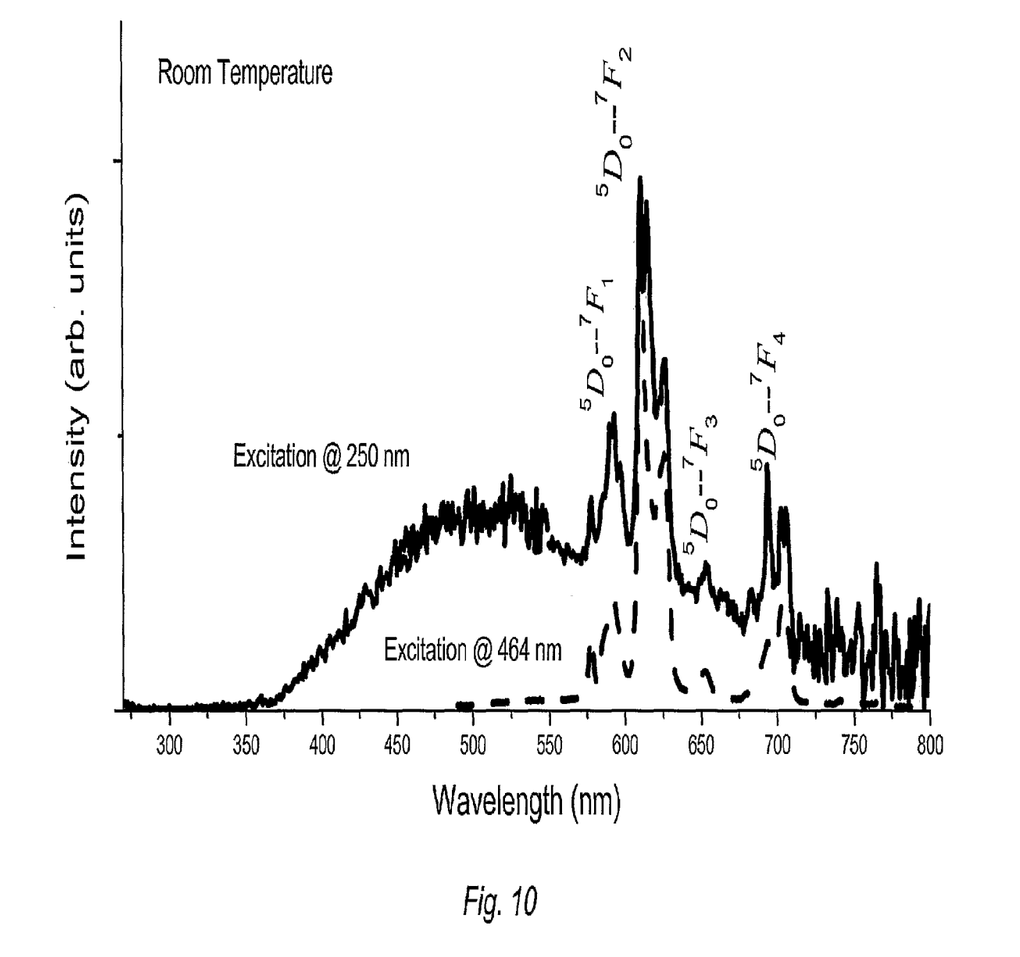
FIG. 10 is a room temperature PL spectrum of AlN:Eu for excitation at 250 nm and 446 nm.

FIG. 10 shows the room temperature PL spectra of an AlN:Eu powder sample. The excitation wavelengths were fixed at 250 nm (solid line) and 464 nm (dashed line). In contrast to other samples discussed, the emission from the defect states appears to be quite strong with 250 nm excitation. Nevertheless in the spectral range from 550 nm to 700 nm, one observes sharp multiplet transitions within the f-manifold. Upon exciting $Eu^{3+}$ directly at 464 nm corresponding to a transition from the ground level, $^7F_0$, to an excited level, $^5D_2$, a well resolved, clean spectrum for $Eu^{3+}$ in AlN is obtained with almost no defect emission.

Figure 11:
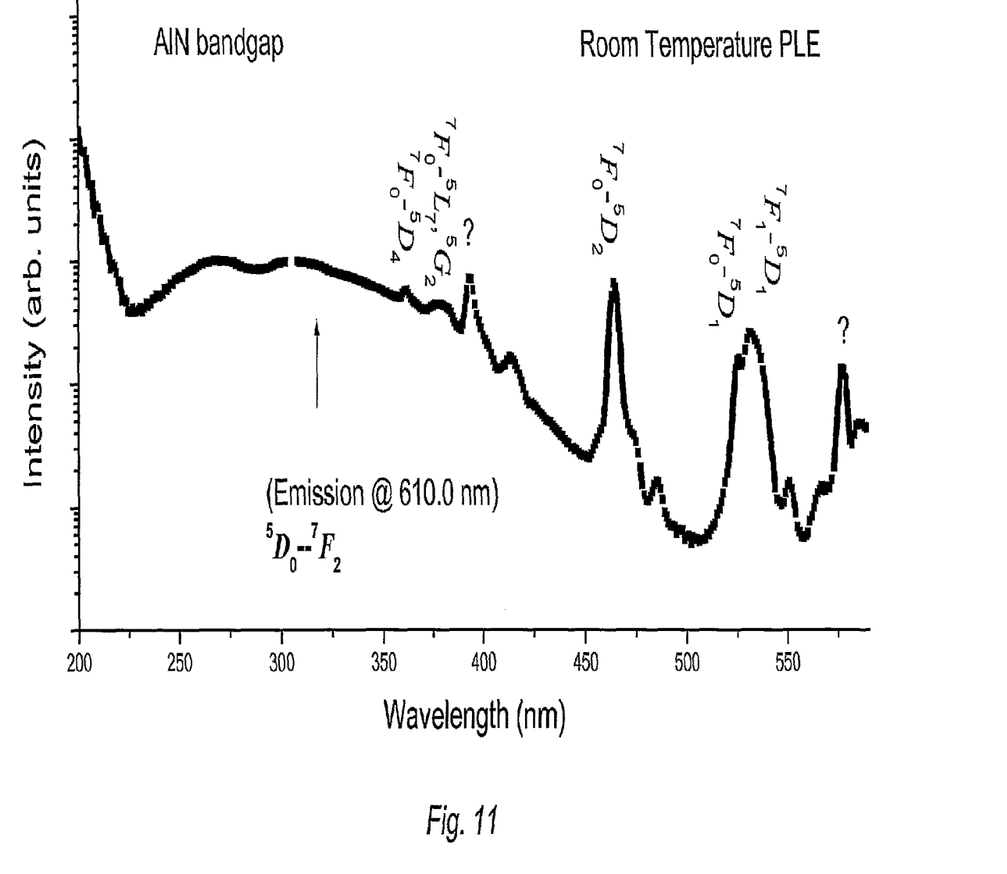
FIG. 11 is a room temperature PLE spectrum of AlN:Eu wherein the emission wavelength is fixed at 610 nm.

To determine the excitation processes leading to the $Eu^{3+}$ f-f intra-configurational transitions, the UV-Visible excitation spectrum was measured with the emission wavelength fixed at 610 nm (corresponding to the $^5D_0$ to $^7F_2$ transition). The PLE spectra (FIG. 11) suggests similar excitation processes, namely, excitation via defects between 300 nm to 560 nm, excitation via energy transfer from the host around 250 nm and direct excitation via its own excited state levels within the $f^N$-manifold. However, the broad peak near 250 nm is not as pronounced as in the case of $Tm^{3+}$ and $Tb^{3+}$.

The observed emissions from $Dy^{3+}$, $Tm^{3+}$, $Tb^{3+}$ and $Eu^{3+}$ in AlN may be optimized for yellow, blue, green and red emission in solid state devices. All these rare earth ions have been shown to be sensitized by a host nitride lattice and defect emission by a nonradiative energy transfer process. It has also been shown that $Tb^{3+}$ could be used as sensitizer for $Eu^{3+}$ in nitride hosts.

While there have been shown and described what are at present considered to be the preferred embodiments of the invention, it will be apparent to those skilled in the art that various changes and modifications can be made herein without departing from the scope of the invention as defined by the appended claims.

We claim:

1. A method of making a rare earth-activated aluminum nitride, comprising:
    (a) forming an aqueous mixture containing aluminum and a rare earth metal;
    (b) precipitating a mixed hydroxide of aluminum and the rare earth metal;
    (c) reacting the mixed hydroxide with ammonium fluoride to form a fluoride compound of aluminum and the rare earth metal;
    (d) drying the fluoride compound; and
    (e) reacting the dried fluoride compound with ammonia gas to form the rare earth-activated aluminum nitride.

2. The method of claim 1 wherein the rare earth metal is selected from Dy, Tb, Eu, Tm, Ho, Sm, Er, Nd, Pr, Gd, and combinations thereof.

3. The method of claim 1 wherein the rare earth metal is selected from Dy, Tb, Eu, Tm, and combinations thereof.

4. The method of claim 1 wherein the aqueous mixture is formed by dissolving aluminum nitrate and a nitrate of the rare earth metal.

5. The method of claim 4 wherein the mixed hydroxide is precipitated by adding ammonium hydroxide to the aqueous mixture.

6. The method of claim 1 wherein the mixed hydroxide is reacted with a stoichiometric excess of ammonium fluoride at about 80° C.

7. The method of claim 1 wherein the fluoride compound is reacted with ammonia gas at about 900° C.

8. The method of claim 1 wherein the fluoride compound is a hexafluoride compound.

9. The method of claim 1 wherein the mixed hydroxide is filtered to produce a filtrate and rinsed until there is no change in the pH of the filtrate.

10. A method of making a rare earth-activated aluminum nitride, comprising:
    (a) forming an aqueous mixture by dissolving aluminum nitrate and a nitrate of a rare earth metal;
    (b) precipitating a mixed hydroxide of aluminum and the rare earth metal by adding ammonium hydroxide to the aqueous mixture;
    (c) reacting the mixed hydroxide with a stoichiometric excess of ammonium fluoride at an elevated temperature to form a hexafluoride compound of aluminum and the rare earth metal;
    (d) drying hexafluoride compound; and
    (e) reacting the dried hexafluoride compound with ammonia gas to form the rare earth-activated aluminum nitride.

11. The method of claim 10 wherein the rare earth metal is selected from Dy, Tb, Eu, Tm, Ho, Sm, Er, Nd, Pr, Gd, and combinations thereof.

12. The method of claim 10 wherein the rare earth metal is selected from Dy, Tb, Eu, Tm, and combinations thereof.

13. The method of claim 10 wherein the hexafluoride compound is reacted with ammonia gas at about 900° C.

14. The method of claim 13 wherein the mixed hydroxide is reacted with the excess ammonium fluoride at about 80° C.

15. The method of claim 14 wherein the rare earth metal is selected from Dy, Tb, Eu, Tm, and combinations thereof.

16. The method of claim 10 wherein the mixed hydroxide is filtered to produce a filtrate and rinsed until there is no change in the pH of the filtrate.

* * * * *